(12) United States Patent
Yamahara et al.

(10) Patent No.: US 10,057,967 B1
(45) Date of Patent: Aug. 21, 2018

(54) LIGHTING DEVICE AND LUMINAIRE

(71) Applicant: Panasonic Intellectual Property Management Co., Ltd., Osaka (JP)

(72) Inventors: Daisuke Yamahara, Osaka (JP); Hiroyuki Asano, Nara (JP); Satoshi Yagi, Osaka (JP); Koki Matsui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/878,116

(22) Filed: Jan. 23, 2018

(30) Foreign Application Priority Data

Feb. 15, 2017 (JP) .................. 2017-026470

(51) Int. Cl.
*H05B 37/00* (2006.01)
*H05B 41/00* (2006.01)
*H05B 37/02* (2006.01)

(52) U.S. Cl.
CPC ..... *H05B 37/0272* (2013.01); *H05B 37/0281* (2013.01)

(58) Field of Classification Search
None
See application file for complete search history.

(56) References Cited

U.S. PATENT DOCUMENTS

2013/0221875 A1* 8/2013 Liao .................. H05B 33/0851
315/307
2015/0249397 A1* 9/2015 Ogasawara ......... H02M 1/4266
315/200 R

FOREIGN PATENT DOCUMENTS

JP 2013-70617 4/2013

* cited by examiner

*Primary Examiner* — Anh Tran
(74) *Attorney, Agent, or Firm* — Renner, Otto, Boisselle & Sklar, LLP

(57) ABSTRACT

A lighting device includes: a first lighting control circuit; a second lighting control circuit which controls the first lighting control circuit; a first control power supply which supplies a first voltage to the first lighting control circuit; a second control power supply to which the first voltage is supplied and which supplies a second voltage to the second lighting control circuit; and a reset circuit which (i) when the reset circuit detects that the first voltage decreases to a first threshold or lower, causes the second control power supply to stop supply of the second voltage, and (ii) when the reset circuit detects that the first voltage increases to a second threshold or higher and that the second voltage is higher than a third threshold, causes the second control power supply to start supply of the second voltage after the second voltage decreases to the third threshold or lower.

20 Claims, 9 Drawing Sheets

LIGHTING DEVICE AND LUMINAIRE

CROSS REFERENCE TO RELATED APPLICATION

This application claims the benefit of priority of Japanese Patent Application Number 2017-026470 filed on Feb. 15, 2017, the entire content of which is hereby incorporated by reference.

BACKGROUND

1. Technical Field

The present disclosure relates to a lighting device which supplies DC power to a light emitting element, and a luminaire.

2. Description of the Related Art

Luminaires which can be remotely operated by a remote control or the like are conventionally known (see, Japanese Unexamined Patent Application Publication No. 2013-70617, for example). The luminaire disclosed by Japanese Unexamined Patent Application Publication No. 2013-70617 includes a dimming signal input circuit to which a dimming signal transmitted from a remote control or the like is input. The dimming signal input circuit outputs to a switching circuit a signal corresponding to the dimming signal. The switching circuit controls a switching element at a duty ratio corresponding to the dimming signal. In this manner, it is possible to remotely operate a dimming level of the luminaire.

In such a luminaire as disclosed by Japanese Unexamined Patent Application Publication No. 2013-70617, a control circuit such as a dimming signal input circuit is implemented by an integrated circuit such as a micro-controller unit (MCU), for example. There are instances where DC power resulting from rectifying and stepping-down AC power supplied from an AC power supply is used in operations of such an integrated circuit. In this case, power supply to the integrated circuit is interrupted by turning off a main power switch of the luminaire. When power supply to the integrated circuit is interrupted and a voltage supplied to the integrated circuit falls below an operation voltage, there could be the case where the integrated circuit is placed to an undefined state, and thus not be able to operate normally. In order to prevent a control failure due to such an undefined state, a reset function is provided to an integrated circuit. For example, when a voltage supplied to the integrated circuit becomes lower than or equal to a reset voltage that is set to a value lower than an operation voltage, the integrated circuit is reset. In this manner, when power supply to the integrated circuit is resumed, the integrated circuit is able to operate normally.

SUMMARY

However, for example, when a main power switch of a luminaire is repeatedly turned on and off in a short amount of time, there could be the case where a voltage supplied to an integrated circuit falls below an operation voltage, and then becomes higher than or equal to an operation voltage lower limit before becoming lower than or equal to a reset voltage. In this case, the integrated circuit is not reset and remains in the undefined state, and thus there are cases where the integrated circuit is not be able to operate normally. Such an operation failure of the integrated circuit could lead to the state where a luminaire cannot be operated by a remote control or the like.

In view of the above, an object of the present disclosure is to provide a lighting device and a luminaire with which it is possible to suppress occurrence of operation failure in a control circuit.

In order to achieve the above-described object, a lighting device according to an aspect of the present disclosure is a lighting device which causes a light emitting element to emit light. The lighting device includes: a DC power supply which converts AC power to DC power; a first lighting control circuit which adjusts a value of a current supplied to the light emitting element, by controlling the DC power supply; a second lighting control circuit which controls the first lighting control circuit; a first control power supply which supplies a first voltage to the first lighting control circuit; a second control power supply to which the first voltage is supplied and which supplies a second voltage to the second lighting control circuit; and a reset circuit which (i) when the reset circuit detects that the first voltage decreases to a first threshold or lower, causes the second control power supply to stop supply of the second voltage, and (ii) when the reset circuit detects that the first voltage increases to a second threshold or higher and that the second voltage is higher than a third threshold, causes the second control power supply to start supply of the second voltage after the second voltage decreases to the third threshold or lower.

In addition, in order to achieve the above-described object, a luminaire according to an aspect of the present disclosure includes the above-described lighting device and the above-described light emitting element.

According to the present disclosure, it is possible to provide a lighting device and a luminaire with which occurrence of operation failure in a control circuit can be suppressed.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes in detail embodiments according to the present disclosure, with reference to the drawings. It should be noted that each of the embodiments described below shows a specific example of the present disclosure. The numerical values, shapes, materials, structural components, the disposition and connection of the structural components, etc. described in the following embodiments are mere examples, and do not intend to limit the present disclosure. Furthermore, among the structural components in the following embodiments, components not recited in the independent claims which indicate the broadest concepts of the present disclosure are described as arbitrary structural components.

In addition, each diagram is a schematic diagram and not necessarily strictly illustrated. Furthermore, in the respective figures, the same numerical sign is given to identical structural components.

Embodiment 1

The following descries a lighting device according to Embodiment 1.

[1-1. Configuration]

First, a configuration of the lighting device according to the present embodiment shall be described with reference to FIG. 1.

Figure 1:
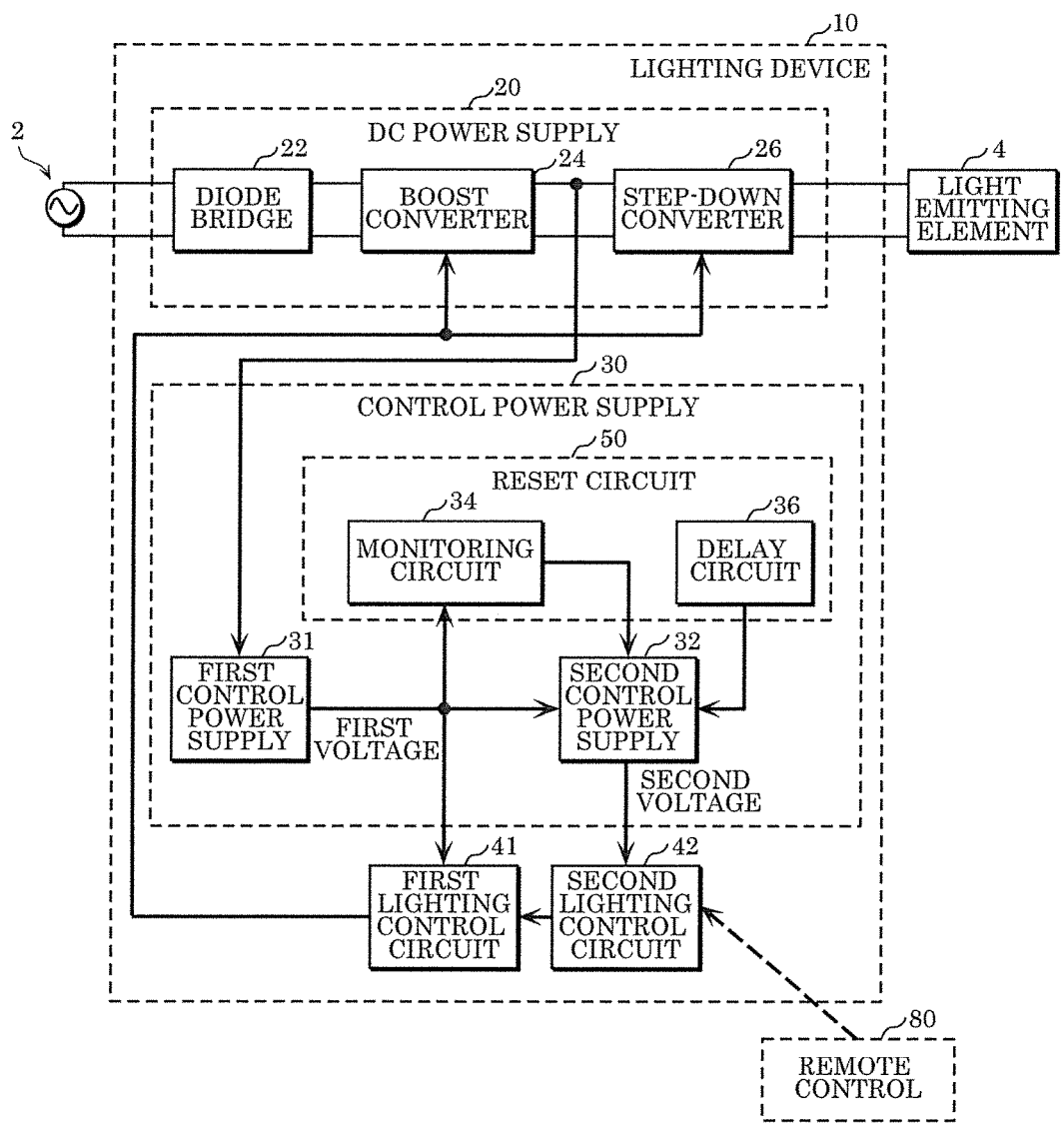
FIG. 1 is a block diagram which illustrates a functional configuration of a lighting device according to Embodiment 1.

FIG. 1 is a block diagram which illustrates a functional configuration of lighting device 10 according to the present embodiment. It should be noted that, in FIG. 1, AC power supply 2 which supplies power to lighting device 10, light emitting element 4 to which power is supplied from lighting device 10, and remote control 80 which remotely operates lighting device 10 are illustrated together with lighting device 10.

AC power supply 2 is a power supply which supplies AC power to lighting device 10. AC power supply 2 is a system power supply such as a commercial AC power supply.

Light emitting element 4 is a light source to which lighting device 10 supplies power. Light emitting element 4 only needs to be a light source which emits light as a result of being supplied with DC power, and is not specifically limited. For example, light emitting element 4 is a solid-state light emitting element such as a light emitting diode (LED).

Remote control 80 is a controller for remotely operating lighting device 10. Remote control 80, for example, performs turning on, turning off, and dimming of light emitting element 4, by controlling lighting device 10. Remote control 80 may be a dedicated controller of lighting device 10, or may be a general mobile terminal such as a smartphone.

Lighting device 10 is a device to which AC power is supplied, and which supplies DC power to light emitting element 4. As illustrated in FIG. 1, lighting device 10 includes DC power supply 20, control power supply 30, first lighting control circuit 41, and second lighting control circuit 42.

DC power supply 20 is a power supply circuit which converts AC power to DC power. According to the present embodiment, DC power supply 20 includes diode bridge 22, boost converter 24, and step-down converter 26. It should be noted that the configuration of DC power supply 20 is not specifically limited. DC power supply 20 only needs to be a power supply circuit which converts AC power to DC power. For example, DC power supply 20 may include a flyback converter, a buck-boost converter, etc.

Diode bridge 22 is a circuit which rectifies AC power supplied from AC power supply 2.

Boost converter 24 is a circuit which boosts a voltage output from diode bridge 22. Boost converter 24 includes, for example, a switching element such as a metal-oxide semiconductor field-effect transistor (MOSFET), etc. The switching element included in boost converter 24 is controlled by first lighting control circuit 41. Boost converter 24, for example, boosts a voltage of approximately 100 V output from diode bridge 22 to a voltage of approximately 200 V.

Step-down converter 26 is a power supply circuit which steps down a voltage output from boost converter 24, and supplies the stepped down voltage to light emitting element 4. Step-down converter 26 includes, for example, a switching element such as a MOSFET. The switching element included in step-down converter 26 is controlled by first lighting control circuit 41. Step-down converter 26, for example, steps down a voltage of approximately 200 V output from boost converter 24, to a voltage suitable for light emitting element 4.

First lighting control circuit 41 is a circuit which adjusts a value of a current to be supplied to light emitting element 4, by controlling DC power supply 20. First lighting control circuit 41 controls DC power supply 20, by outputting, for example, corresponding pulse width modulation (PWM) signals to a switching element of each of boost converter 24 and step-down converter 26 of DC power supply 20. Power for causing first lighting control circuit 41 to operate is supplied from control power supply 30. First lighting control circuit 41 is implemented by a micro-controller unit, for example. A microcomputer is a single-chip semiconductor integrated circuit which includes a ROM in which a program is stored, a RAM, a processor (central processing unit (CPU)) which executes a program, a timer, an input and output circuit including an A/D converter and a D/A converter, etc.

Second lighting control circuit 42 is a circuit which controls first lighting control circuit 41. According to the present embodiment, second lighting control circuit 42 includes a wireless communication integrated circuit which outputs, to first lighting control circuit 41, an instruction signal for instructing turning on, turning off, or dimming of light emitting element 4, according to an input signal from outside. The wireless communication integrated circuit is implemented by a micro-controller unit, as with first lighting control circuit 41.

Second lighting control circuit 42, for example, receives an input signal from a controller such as remote control 80. Power for causing second lighting control circuit 42 to operate is supplied from control power supply 30. The wireless communication integrated circuit included by second lighting control circuit 42 has, for example, an operation voltage lower limit of 1.8 V. The wireless communication integrated circuit is reset when a voltage lower than or equal to a reset voltage of 1.0 V is supplied. Accordingly, the wireless communication integrated circuit operates normally when a voltage of higher than or equal to 1.8 V is supplied. The wireless communication integrated circuit is reset when a voltage lower than or equal to 1.0 V is supplied, and is capable of operating normally at the time of reactivation (i.e., at the time when a voltage higher than or equal to the operation voltage lower limit is supplied next time). Meanwhile, the wireless communication integrated circuit is placed to an undefined state when a voltage higher than the reset voltage (1.0 V) and lower than the operation voltage lower limit (1.8 V) is supplied. In other words, the wireless communication integrated circuit is placed in a state in which a normal operation is not secured. It should be noted that the wireless communication integrated circuit does not have a function of being reset forcibly from outside.

Control power supply 30 is a power supply circuit which generates a first voltage and a second voltage for causing first lighting control circuit 41 and second lighting control circuit 42, respectively, to operate. Control power supply 30 includes first control power supply 31, second control power supply 32, and reset circuit 50.

First control power supply 31 is a power supply circuit which supplies a first voltage to first lighting control circuit 41. First control power supply 31 only needs to be a circuit which outputs the first voltage, and the configuration of first control power supply 31 is not specifically limited. For example, first control power supply is a step-down converter to which an output voltage from boost converter 24 is input, and which steps down the output voltage. According to the present embodiment, first control power supply 31 steps down the output voltage of approximately 200 V from boost converter 24 to be a first voltage of 5V. First control power supply 31 supplies the first voltage to second control power supply 32.

Second control power supply 32 is a power supply circuit to which the first voltage is supplied by first control power supply 31, and which supplies a second voltage to second lighting control circuit 42. Second control power supply 32 only needs to be a circuit to which the first voltage is supplied, and which outputs the second voltage, and the configuration of second control power supply 32 is not specifically limited. For example, second control power supply 32 is a three-terminal regulator. According to the present embodiment, second control power supply 32 steps down the first voltage of 5 V to a second voltage of 3V. In addition, starting and stopping of an operation of second control power supply 32, and a delay time for starting supply of a second voltage by second control power supply 32 are controlled by reset circuit 50.

Reset circuit 50 is a circuit which monitors the first voltage and controls an operation of second control power supply 32 according to the first voltage, thereby suppressing occurrence of operation failure in second lighting control circuit 42. More specifically, reset circuit 50 causes second control power supply 32 to stop supply of the second voltage, when reset circuit 50 detects that the first voltage decreases from a value higher than first threshold Vth1 to a value lower than or equal to first threshold Vth1. In addition, when (i) reset circuit 50 detects that the first voltage increases from a value lower than second threshold Vth2 to a value higher than or equal to second threshold Vth2, and (ii) the second voltage is higher than the third threshold, reset circuit 50 causes second control power supply 32 to start supply of the second voltage after the second voltage decreases to the third threshold or lower.

Here, first threshold Vth1 and second threshold Vth2 are each a value higher than or equal to the operation voltage lower limit of the wireless communication integrated circuit included in second lighting control circuit 42. According to the present embodiment, first threshold Vth1 and second threshold Vth2 are each 2.4 V, for example. In this manner, as a result of a value of the first voltage falling below the operation voltage lower limit of the wireless communication integrated circuit, it is possible to stop an operation of second control power supply 32 when the second voltage of second control power supply 32 falls below the operation voltage lower limit. For that reason, it is possible to cause second control power supply 32 to operate only when the second voltage can be higher than or equal to the operation voltage lower limit. It should be noted that, although first threshold Vth1 and second threshold Vth2 are the same value according to the present embodiment, first threshold Vth1 and second threshold Vth2 may be values different from each other. For example, first threshold Vth1 may be set to 2.3 V and second threshold Vth2 may be set to 2.5 V, and control in reset circuit 50 may implement hysteresis.

In addition, the third threshold is a value lower than or equal to a reset voltage (1.0 V) of the wireless communication integrated circuit of second lighting control circuit 42. According to the present embodiment, the reset voltage is the third threshold. Details of the operations performed by reset circuit 50 will be given later. Reset circuit 50 includes monitoring circuit 34 and delay circuit 36.

Monitoring circuit 34 is a circuit which monitors the first voltage, and controls second control power supply 32 according to the first voltage. Monitoring circuit 34 outputs a control signal for causing second control power supply 32 to stop supply of the second voltage, when monitoring circuit 34 detects that the first voltage decreases from a value higher than first threshold Vth1 to a value lower than or equal to first threshold Vth1. In addition, monitoring circuit 34 outputs a control signal for causing second control power supply 32 to start supply of the second voltage, when monitoring circuit 34 detects that the first voltage increases from a value lower than second threshold Vth2 to a value higher than or equal to second threshold Vth2.

Delay circuit 36 is a circuit which delays the start of supply of the second voltage by second control power supply 32. According to the present embodiment, delay circuit 36 delays the start of supply of the second voltage from when a control signal for causing second control power supply 32 to start supply of the second voltage is input by monitoring circuit 34 to when first delay time Td1 passes. It should be noted that, in order to delay the start of supply of the second voltage from second control power supply 32, delay circuit 36 may cause the supply of the second voltage to be started when first delay time Td1 passes after the control signal is received by second control power supply 32, or may cause an output of the control signal from monitoring circuit 34 to second control power supply 32 to be delayed. First delay time Td1 is, for example, longer than or equal to approximately 50 msec and shorter than or equal to approximately 300 msec. More preferably, first delay time Td1 is longer than or equal to approximately 80 msec and shorter than or equal to approximately 200 msec. Details of first delay time Td1 will be given later.

Monitoring circuit 34 and delay circuit 36 included in reset circuit 50 can be implemented by combining, for example, elements such as a comparator, a transistor, a capacitor, etc. It should be noted that the first voltage monitored by monitoring circuit 34 may be supplied to reset circuit 50 for causing reset circuit 50 to operate. In addition, the circuit configuration of reset circuit 50 is not limited to the circuit configuration illustrated in FIG. 1. For example, one of monitoring circuit 34 and delay circuit 36 included in reset circuit 50 may be implemented by a single integrated circuit. An example of such a circuit configuration will be described with reference to FIG. 2.

Figure 2:
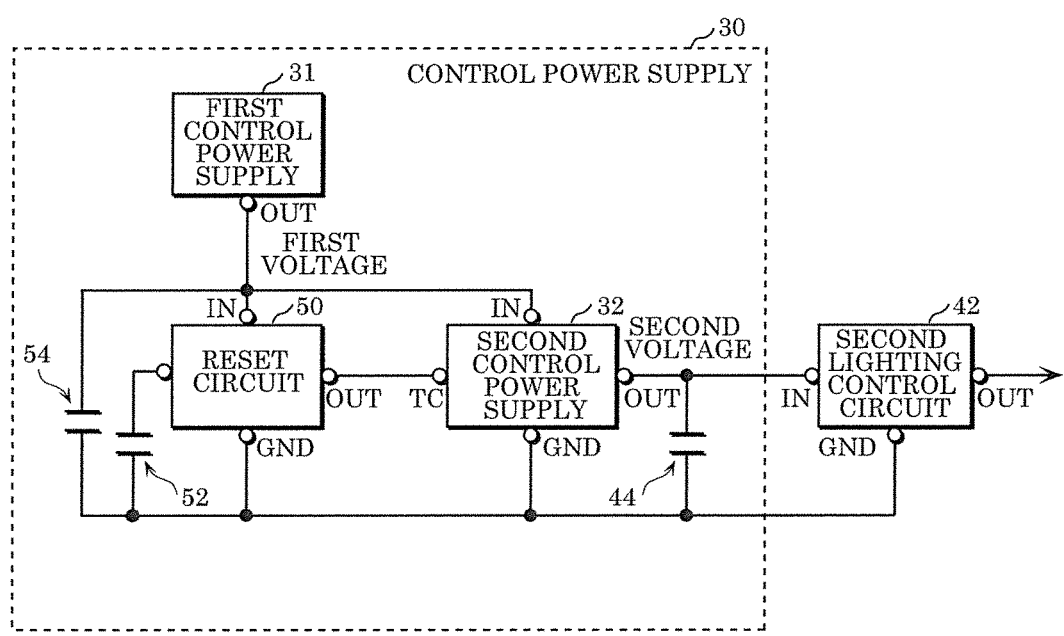
FIG. 2 is a circuit diagram which illustrates another example of a circuit configuration of a control power supply according to Embodiment 1.

FIG. 2 is a circuit diagram which illustrates another example of the circuit configuration of control power supply 30 according to the present embodiment. It should be noted that, in FIG. 2, second lighting control circuit 42 is also illustrated together with control power supply 30. As illustrated in FIG. 2, control power supply 30 includes reset circuit 50, first control power supply 31, and second control power supply 32 which are implemented by a single integrated circuit. Control power supply 30 further includes capacitors 44, 52, and 54. Capacitors 54 and 44 are elements for stabilizing the first voltage output from first control power supply 31 and the second voltage output from second control power supply 32, respectively. Capacitor 52 is an element for adjusting first delay time Td1.

As illustrated in FIG. 2, the first voltage output from output terminal OUT of first control power supply 31 is input to each of input terminals IN of reset circuit 50 and second control power supply 32. It should be noted that, although not illustrated in FIG. 2, the first voltage is also input to first lighting control circuit 41. Reset circuit 50 outputs a control signal for controlling a start and a stop of the supply of the second voltage, from output terminal OUT to control terminal TC of second control power supply 32. In the example illustrated in FIG. 2, a control signal for instructing a start of supply of the second voltage is output from output terminal OUT of reset circuit 50, when first delay time Td1 passes from a time point when reset circuit 50 detects that the first voltage has increased from a value lower than second threshold Vth2 to a value higher than or equal to second threshold Vth2. In this manner, it is possible to produce an advantageous effect same as or similar to the advantageous effect produced by lighting device 10 illustrated in FIG. 1. In addition, it is possible to implement reset circuit 50 by a single integrated circuit according to the circuit configuration illustrated in FIG. 2. Accordingly, the size of control power supply 30 can be reduced.

(1-2. Operation)

Next, an operation of lighting device 10 according to the present embodiment will be described with reference to FIG. 3 and FIG. 4.

Figure 3:
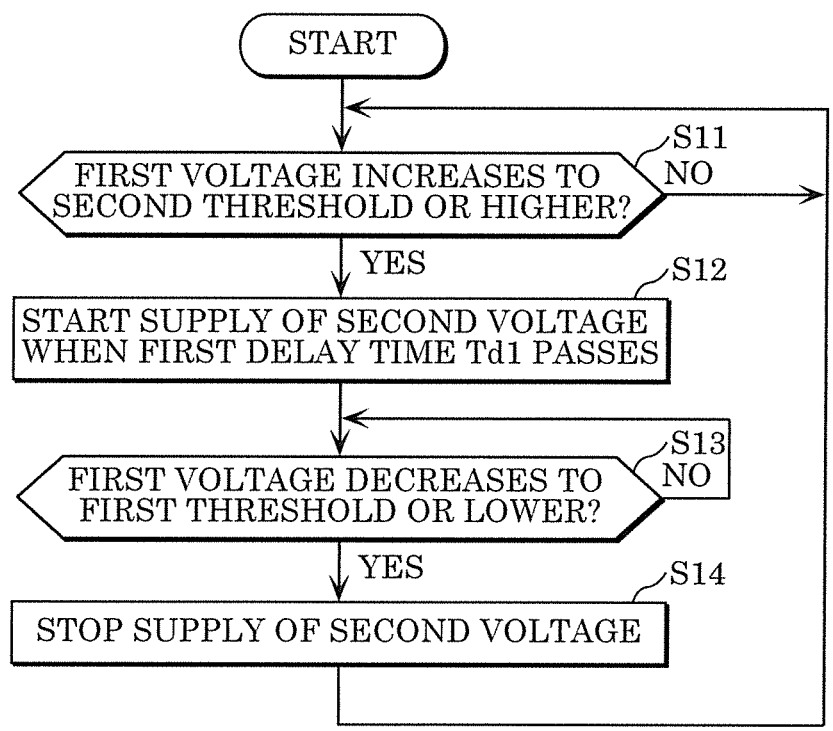
FIG. 3 is a flowchart which illustrates an operation of the lighting device according to Embodiment 1.

FIG. 3 is a flowchart which illustrates an operation of lighting device 10 according to the present embodiment. FIG. 4 is a graph which illustrates an example of temporal waveforms of the first voltage and the second voltage in lighting device 10 according to the present embodiment.

Figure 4:
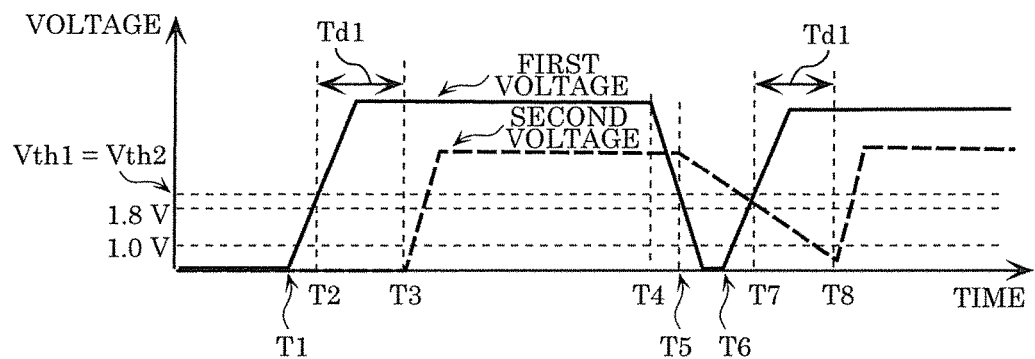
FIG. 4 is a graph which illustrates an example of temporal waveforms of a first voltage and a second voltage in the lighting device according to Embodiment 1.

The following describes the flow of an operation performed by lighting device 10 illustrated in FIG. 3, with reference to FIG. 4.

First, an operation of lighting device 10 is started as illustrated in FIG. 3 (at time point T1 and at time point T6 in FIG. 4). Along with the start of the operation of lighting device 10, the first voltage output from first control power supply 31 increases (from time point T1 to time point T2, and from time point T6 to time point T7 in FIG. 4).

Monitoring circuit 34 of reset circuit 50 in lighting device 10 monitors the first voltage, and determines whether or not an increase from a value lower than second threshold Vth2 to a value higher than or equal to second threshold Vth2 is detected in the first voltage (S11).

When monitoring circuit 34 detects that the first voltage has increased from a value lower than second threshold Vth2 to a value higher than or equal to second threshold Vth2 (YES in S11), monitoring circuit 34 causes second control power supply 32 to start supply of the second voltage when first delay time Td1 passes from a time point of the detection (S12). In the example illustrated in FIG. 4, power supply from AC power supply 2 is started and the first voltage output from first control power supply 31 starts to increase at time point T1 and time point T6, and the first voltage reaches second threshold Vth2 (Vth2=Vth1, according to the present embodiment) at time point T2 and time point T7. Accordingly, at time point T2 and time point T7, monitoring circuit 34 outputs a control signal for causing second control power supply 32 to start supply of the second voltage. Second control power supply 32 starts supply of the second voltage at time point T3 and time point T8 when first delay time Td1 determined by delay circuit 36 passes from time point T2 and time point T7 when the control signal is received. As indicated by time point T7 to time point T8 in FIG. 4, first delay time Td1 is a period of time longer than or equal to a period of time required for the second voltage to decrease from the operation voltage lower limit (1.8 V) of the wireless communication integrated circuit of second lighting control circuit 42 to a reset voltage (1.0 V) when second control power supply 32 causes the supply of the second voltage to be stopped. For that reason, when second control power supply 32 receives an instruction for resuming the supply of the second voltage, the second voltage is lower than or equal to the reset voltage of the wireless communication integrated circuit. In other words, the second voltage decreases to the reset voltage or lower after the second voltage falls into a range of the undefined state that is (i) lower than the operation voltage lower limit of the wireless communication integrated circuit and (ii) higher than the reset voltage, thereby reliably resetting the wireless communication integrated circuit at time point T8. Accordingly, it is possible to suppress occurrence of control failure in the wireless communication integrated circuit.

Subsequent to Step S12, the operation proceeds to Step S13. In the case where, in Step S11, monitoring circuit 34 does not detect an increase from a value lower than second threshold Vth2 to a value higher than or equal to second threshold Vth2 in the first voltage (NO in S11), the operation returns to Step S11. In the example illustrated in FIG. 4, monitoring circuit 34 performs determination as described above in a period from time point T1 to immediately before time point T2, and a period from time point T6 to immediately before time point T7.

Next, monitoring circuit 34 continues monitoring of the first voltage, and determines whether or not a decrease from a value higher than first threshold Vth1 to a value lower than or equal to first threshold Vth1 is detected in the first voltage (S13).

When monitoring circuit 34 detects that the first voltage has decreased from a value higher than first threshold Vth1 to a value lower than or equal to first threshold Vth1 (YES in S13), monitoring circuit 34 causes second control power supply 32 to stop the supply of the second voltage (S14). For example, in the example illustrated in FIG. 4, the first voltage output from first control power supply 31 starts to decrease due to, for example, a stop of power supply from AC power supply 2 at time point T4, and the first voltage reaches first threshold Vth1 at time point T5. Accordingly, at time point T5, monitoring circuit 34 outputs a control signal for causing second control power supply 32 to stop the supply of the second voltage. Subsequent to Step S14, the operation returns to Step S11.

On the other hand, when monitoring circuit 34 does not detect that the first voltage has decreased from a value higher than first threshold Vth1 to a value lower than or equal to first threshold Vth1 (NO in S13), monitoring circuit 34 does not cause second control power supply 32 to stop the supply of the second voltage, and the operation returns to Step S13. In the example illustrated in FIG. 4, monitoring circuit 34 performs determination as described above in a period from time point T3 to time point T4, for example.

Lighting device 10 repeats the above-described processes from Step S11 to Step S14.

As described above, lighting device 10 is capable of suppressing occurrence of control failure in the wireless communication integrated circuit of second lighting control circuit 42. Here, in order to explain an advantageous effect of lighting device 10, an operation example of a lighting device according to a comparison example will be described with reference to FIG. 5.

Figure 5:
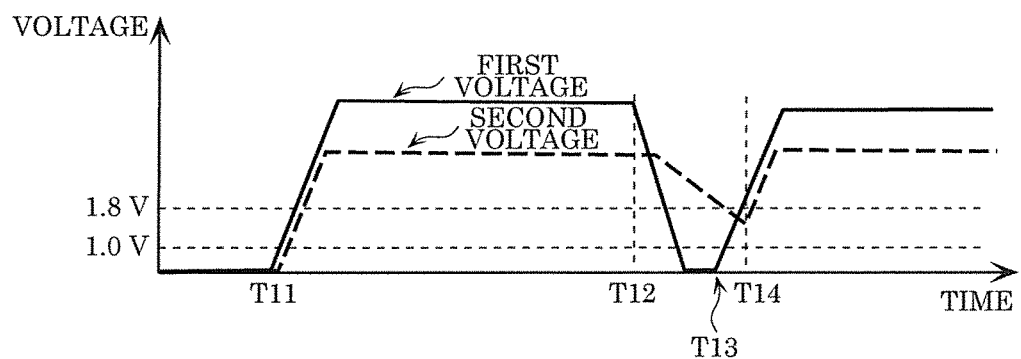
FIG. 5 is a graph which illustrates an example of temporal waveforms of a first voltage and a second voltage in a lighting device according to a comparison example.

FIG. 5 is a graph which illustrates an example of temporal waveforms of the first voltage and the second voltage in a lighting device according to the comparison example. The lighting device according to the comparison example has a configuration same as the configuration of lighting device 10 according to the present embodiment, other than that the lighting device according to the comparison example does not include reset circuit 50.

As illustrated in FIG. 5, when supply of AC power to the lighting device according to the comparison example is started at time point T11, the first voltage starts to increase, and the second voltage also starts to increase along with the increase of the first voltage. When the supply of AC power is stopped at time point T12, the first voltage starts to decrease, and the second voltage also starts to decrease along with the decrease of the first voltage. When supply of AC power is started at time point T13 immediately after time point T12, the first voltage starts to increase, and the second voltage also starts to increase at time point T14 immediately after time point T13 and exceeds the operation voltage lower limit of the wireless communication integrated circuit. At the above-described time point T14, there could be the case where the second voltage is lower than the operation voltage lower limit (1.8 V) of the wireless communication integrated circuit and higher than the reset voltage (1.0 V), as illustrated in FIG. 5. In this case, the wireless communication integrated circuit is supplied with the second voltage higher than or equal to the operation voltage lower limit, without being reset from the undefined state. Accordingly, control failure could occur in the wireless communication integrated circuit.

In contrast, with lighting device 10 according to the present embodiment, the second voltage decreases to the reset voltage or lower after the second voltage falls into a range of the undefined state as described above. As a result, the wireless communication integrated circuit is reliably reset. For that reason, with lighting device 10, it is possible to suppress occurrence of control failure more reliably than the lighting device according to the comparison example.

In addition, in lighting device 10, first delay time Td1 may be longer than an unstable time taken from a start of DC power supply 20 until an operation is stabilized. Here, that the operation of DC power supply 20 is stabilized indicates, for example, the state in which a variation width of an output voltage of DC power supply 20 is less than or equal to 5%. With this, since the wireless communication integrated circuit of second lighting control circuit 42 is activated after the operations of first lighting control circuit 41 and DC power supply 20 are stabilized, it is possible to prevent a communication of the wireless communication integrated circuit from being affected by a noise due to an inrush current at the time of a start of DC power supply 20. It should be noted that the unstable time is approximately 100 msec, for example.

[1-3. Conclusion]

As described above, lighting device 10 according to the present embodiment is a device which causes light emitting element 4 to emit light. Lighting device 10 includes: DC power supply 20 which converts AC power to DC power; first lighting control circuit 41 which adjusts a value of a current supplied to light emitting element 4 by controlling DC power supply 20; and second lighting control circuit 42 which controls first lighting control circuit 41.

Lighting device 10 further includes: first control power supply 31 which supplies a first voltage to first lighting control circuit 41; second control power supply 32 to which the first voltage is supplied and which supplies a second voltage to second lighting control circuit 42; and reset circuit 50. Reset circuit 50, when reset circuit 50 detects that the first voltage decreases to a first threshold or lower, causes second control power supply 32 to stop supply of the second voltage. In addition, reset circuit 50, when reset circuit 50 detects that the first voltage increases to a second threshold or higher and that the second voltage is higher than a third threshold, causes second control power supply 32 to start supply of the second voltage after the second voltage decreases to the third threshold or lower.

In this manner, it is possible to resume supply of the second voltage after the second voltage decreases to the third threshold or lower, by causing second control power supply 32 to stop the supply of the second voltage. Here, when the third threshold is a value lower than or equal to the reset voltage at which the wireless communication integrated circuit of second lighting control circuit 42 is reset, it is possible to reliably reset the wireless communication integrated circuit. In other words, the second voltage decreases to the reset voltage or lower after the second voltage falls into a range of the undefined state of the wireless communication integrated circuit, and thus the wireless communication integrated circuit is reliably reset. For that reason, lighting device 10 is capable of suppressing occurrence of control failure in second lighting control circuit 42.

In addition, in lighting device 10, reset circuit 50 may cause second control power supply 32 to start supply of the second voltage when first delay time Td1 passes from a time point when reset circuit 50 detects that the first voltage has increased to second threshold Vth2 or higher.

In this manner, a time sufficiently long for the second voltage to decrease to the third threshold or lower after second control power supply 32 is caused to stop is set as the first delay time, and thus it is possible to reliably cause the second voltage to decrease to the third threshold or lower. In addition, the control performed by second control power supply 32 to cause a start of supply of the second voltage to be delayed can be achieved by a simplified circuit configuration. Thus, it is possible to simplify the configuration of lighting device 10.

In addition, in lighting device 10, second lighting control circuit 42 may include a wireless communication integrated circuit which outputs, to first lighting control circuit 41, an instruction signal for instructing one of turning on, turning off, and dimming of light emitting element 4, according to an input signal from outside.

In this manner, when second lighting control circuit 42 includes the wireless communication integrated circuit, it is possible to suppress occurrence of control failure in the wireless communication integrated circuit as described above.

In addition, in lighting device 10, the first delay time may be longer than or equal to a period of time required for the second voltage to decrease from an operation voltage lower limit of the wireless communication integrated circuit to a reset voltage at which the wireless communication integrated circuit is reset, when reset circuit 50 causes second control power supply 32 to stop supply of the second voltage.

In this manner, when the supply of the second voltage is resumed by second control power supply 32, the wireless communication integrated circuit is reliably reset. For that reason, it is possible to more reliably suppress occurrence of control failure in the wireless communication integrated circuit.

In addition, in lighting device 10, at least one of first threshold Vth1 and second threshold Vth2 may be higher than or equal to an operation voltage lower limit of the wireless communication integrated circuit.

In this manner, as a result of the first voltage falling below the operation voltage lower limit of the wireless communication integrated circuit, it is possible to stop supply of the second voltage from second control power supply 32 before the second voltage of second control power supply 32 falls below the operation voltage lower limit. For that reason, it is possible to cause second control power supply 32 to operate only when the second voltage can be higher than or equal to the operation voltage lower limit.

In addition, in lighting device 10, the first delay time may be longer than a period of time taken from a start of DC power supply 20 until an operation of DC power supply 20 is stabilized.

With this, since the wireless communication integrated circuit of second lighting control circuit 42 is activated after the operations of first lighting control circuit 41 and DC power supply 20 are stabilized, it is possible to prevent a communication of the wireless communication integrated circuit from being affected by a noise due to an inrush current at the time of a start of DC power supply 20.

In addition, in lighting device 10, second control power supply 32 may include a three-terminal regulator.

According to this configuration, it is possible to simplify the configuration of second control power supply 32.

Embodiment 2

The following descries a lighting device according to Embodiment 2. The lighting device according to the present embodiment is different from lighting device 10 according to Embodiment 1, in that a second voltage output from second control power supply 32 is monitored, and control is performed based on a value of the second voltage. The following describes the lighting device according to the present embodiment, focusing on the difference from lighting device 10 according to Embodiment 1.

[2-1. Configuration]

A configuration of the lighting device according to the present embodiment shall be described with reference to FIG. 6.

Figure 6:
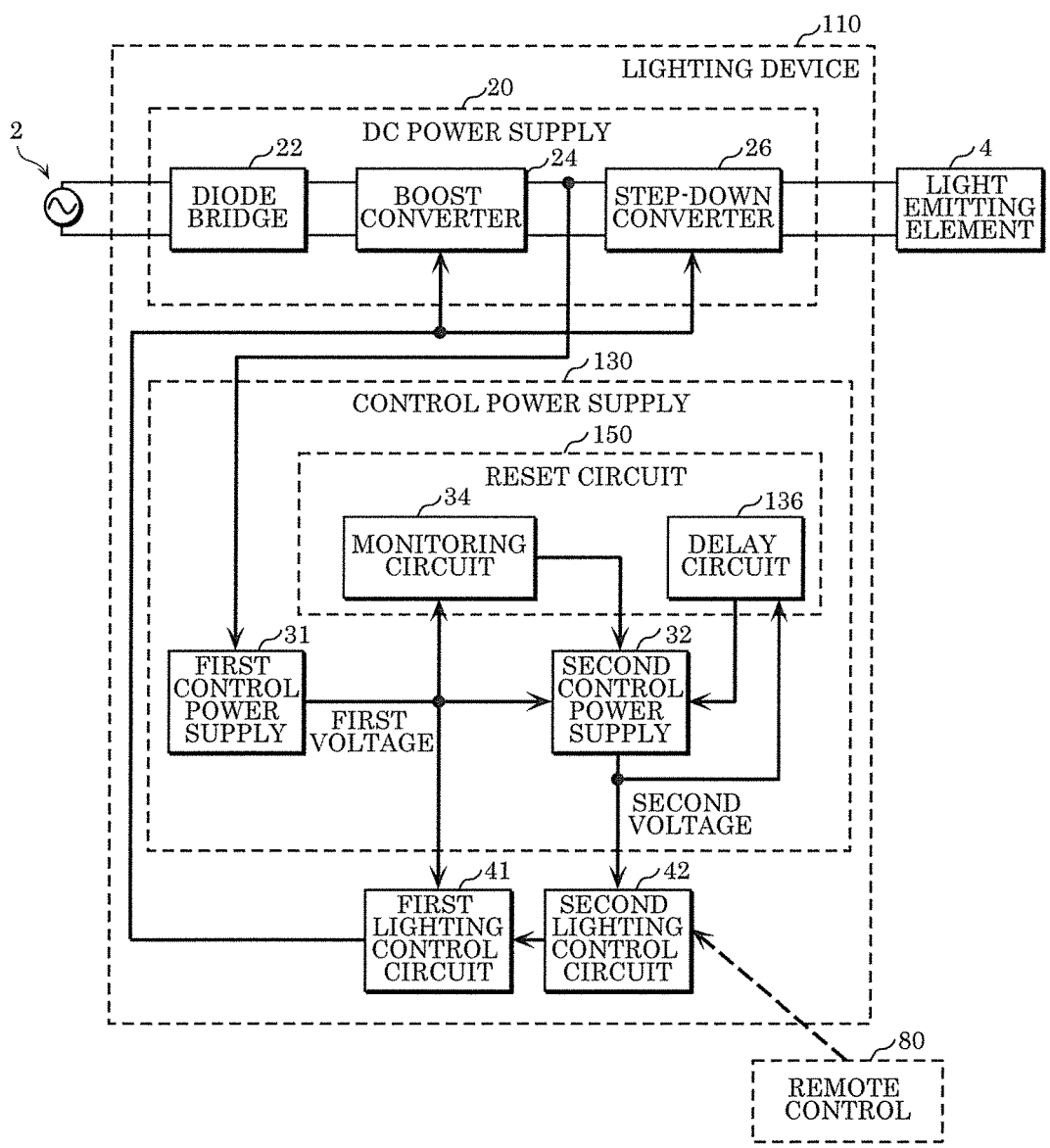
FIG. 6 is a block diagram which illustrates a functional configuration of a lighting device according to Embodiment 2.

FIG. 6 is a block diagram which illustrates a functional configuration of lighting device 110 according to the present embodiment. As illustrated in FIG. 6, lighting device 110 includes DC power supply 20, control power supply 130, first lighting control circuit 41, and second lighting control circuit 42, as with lighting device 10 according to Embodiment 1. Lighting device 110 is different from lighting device 10 according to Embodiment 1, in the configuration of reset circuit 150 of control power supply 130.

Reset circuit 150 causes second control power supply 32 to stop supply of the second voltage when reset circuit 150 detects that the first voltage decreases from a value higher than first threshold Vth1 to a value lower than or equal to first threshold Vth1, as with reset circuit 50 according to Embodiment 1. In addition, reset circuit 150 interrupts supply of the second voltage to second lighting control circuit 42 when reset circuit 150 detects that (i) the first voltage has increased from a value lower than second threshold Vth2 to a value higher than or equal to second threshold Vth2, and (ii) the second voltage is higher than a third threshold and lower than a fourth threshold. Here, the third threshold is the reset voltage (1.0 V) of the wireless communication integrated circuit of second lighting control circuit 42, and the fourth threshold is the lower limit value (1.8 V) of the operation voltage of the wireless communication integrated circuit of second lighting control circuit 42. It should be noted that the third threshold and the fourth threshold only need to be substantially the same as the reset voltage and the operation voltage lower limit, respectively. The third threshold and the fourth threshold need not necessarily be completely identical to the reset voltage and the operation voltage lower limit, respectively. For example, the third threshold and the fourth threshold may have errors of approximately 5% from the reset voltage and the operation voltage lower limit, respectively.

As illustrated in FIG. 6, reset circuit 150 includes monitoring circuit 34 and delay circuit 136.

Monitoring circuit 34, in the same manner as Embodiment 1, outputs a control signal for causing second control power supply 32 to stop supply of the second voltage, when monitoring circuit 34 detects that the first voltage has decreased from a value higher than first threshold Vth1 to a value lower than or equal to first threshold Vth1. In addition, monitoring circuit 34 outputs a control signal for causing second control power supply 32 to start supply of the second voltage, when monitoring circuit 34 detects that the first voltage has increased from a value lower than second threshold Vth2 to a value higher than or equal to second threshold Vth2.

Delay circuit 136 monitors the second voltage output from second control power supply 32. When delay circuit 136 detects that the second voltage is higher than the third threshold and lower than the fourth threshold, delay circuit 136 interrupts the supply of the second voltage to second lighting control circuit 42. In addition, when delay circuit 136 detects that the second voltage is lower than or equal to the third threshold and higher than or equal to the fourth threshold, delay circuit 136 causes second control power supply 32 to start supply of the second voltage to second lighting control circuit 42. According to the present embodiment, delay circuit 136 may cause the supply of the second voltage to be started after at least minimum delay time Tdmin passes from a time point when monitoring circuit 34 detects that the first voltage has increased from a value lower than second threshold Vth2 to a value higher than or equal to second threshold Vth2. It is possible to prevent a communication of the wireless communication integrated circuit from being affected by a noise due to an inrush current at the time of a start of DC power supply 20, by setting minimum delay time Tdmin to a time longer than an unstable time taken from a start of DC power supply 20 until an operation is stabilized.

(2-2. Operation)

Next, an operation of lighting device 110 according to the present embodiment will be described with reference to FIG. 7 and FIG. 8.

Figure 7:
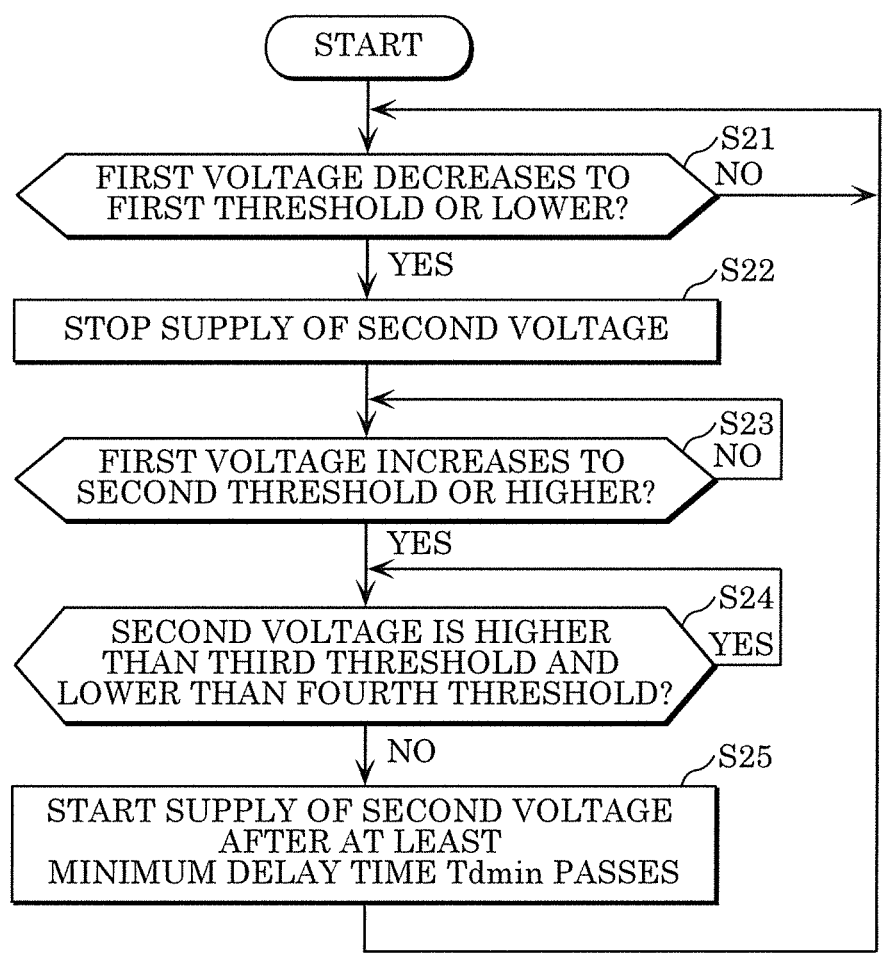
FIG. 7 is a flowchart which illustrates an example of an operation of the lighting device according to Embodiment 2.

FIG. 7 is a flowchart which illustrates an example of an operation of lighting device 110 according to the present embodiment. FIG. 8 is a graph which illustrates an example of temporal waveforms of the first voltage and the second voltage in lighting device 110 according to the present embodiment.

Figure 8:
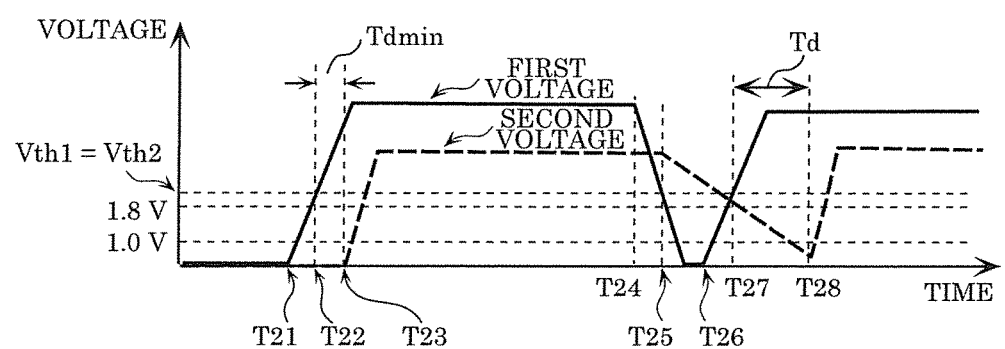
FIG. 8 is a graph which illustrates an example of temporal waveforms of a first voltage and a second voltage in the lighting device according to Embodiment 2.

The following describes the flow of an operation performed by lighting device 110 illustrated in FIG. 7, with reference to FIG. 8.

As illustrated in FIG. 7, first, monitoring circuit 34 of reset circuit 150 in lighting device 110 monitors the first voltage, and determines whether or not a decrease from a value higher than the first threshold Vth1 to a value lower than or equal to the first threshold Vth1 is detected in the first voltage (S21).

When monitoring circuit 34 does not detect that the first voltage has decreased from a value higher than first threshold Vth1 to a value lower than or equal to first threshold Vth1 (NO in S21), monitoring circuit 34 repeatedly performs Step S21 until monitoring circuit 34 detects that the first voltage has decreased from a value higher than first threshold Vth1 to a value lower than or equal to first threshold Vth1. In the example illustrated in FIG. 8, monitoring circuit 34 performs determination as described above in a period from time point T23 to time point T24, for example.

On the other hand, when monitoring circuit 34 detects that the first voltage has decreased from a value higher than first threshold Vth1 to a value lower than or equal to first threshold Vth1 (YES in S21), monitoring circuit 34 causes second control power supply 32 to stop supply of the second voltage (S22). For example, in the example illustrated in FIG. 8, the first voltage output from first control power supply 31 starts to decrease due to, for example, a stop of power supply from AC power supply 2 at time point T24, and the first voltage reaches first threshold Vth1 at time point T25. Accordingly, at time point T25, monitoring circuit 34 outputs a control signal for causing second control power supply 32 to stop the supply of the second voltage.

Monitoring circuit 34 continues monitoring of the first voltage, and determines whether or not an increase from a value lower than second threshold Vth2 to a value higher than or equal to second threshold Vth2 is detected in the first voltage (S23).

When monitoring circuit 34 does not detect that the first voltage has increased from a value lower than second threshold Vth2 to a value higher than or equal to second threshold Vth2 (NO in S23), monitoring circuit 34 repeatedly performs Step S23 until monitoring circuit 34 detects that the first voltage has increased from a value lower than second threshold Vth2 to a value higher than or equal to second threshold Vth2. In the example illustrated in FIG. 8, monitoring circuit 34 performs such determination as described above in a period prior to T21, for example.

On the other hand, when monitoring circuit 34 detects that the first voltage has increased from a value lower than second threshold Vth2 to a value higher than or equal to second threshold Vth2 (YES in S23), delay circuit 136 monitors the second voltage. Delay circuit 136 determines whether or not delay circuit 136 detects that the second voltage is a value higher than the third threshold (1.0 V) and lower than the fourth threshold (1.8 V) (S24). According to the present embodiment, when an increase in the first voltage from a value lower than second threshold Vth2 to a value higher than or equal to second threshold Vth2 is detected, monitoring circuit 34 outputs a control signal for causing second control power supply 32 to start an operation. In the example illustrated in FIG. 8, monitoring circuit 34 outputs a control signal for causing second control power supply 32 to start an operation, at time point T27. However, at time point T27, the supply of the second voltage from second control power supply 32 is stopped by delay circuit 136.

When delay circuit 136 detects that the second voltage is a value higher than the third threshold and lower than the fourth threshold (YES in S24), delay circuit 136 repeatedly performs Step S24 until delay circuit 136 detects that (i) the second voltage decreases to a value lower than or equal to the third threshold, or (ii) the second voltage increases to a value higher than or equal to the fourth threshold. In the example illustrated in FIG. 8, delay circuit 136 performs such determination as described above from immediately after time point T27 to immediately before time point T28.

On the other hand, when delay circuit 136 does not detect that the second voltage is a value higher than the third threshold and lower than the fourth threshold (NO in S24), monitoring circuit 34 causes supply of the second voltage to be started after at least minimum delay time Tdmin passes from a time point when monitoring circuit 34 detects that the first voltage has increased from a value lower than second threshold Vth2 to a value higher than or equal to second threshold Vth2 (S25). More specifically, delay circuit 136 causes second control power supply 32 to start supply of the second voltage after at least (i) minimum delay time Tdmin passes from a time point when monitoring circuit 34 detects that the first voltage has increased from a value lower than second threshold Vth2 to a value higher than or equal to second threshold Vth2, and (ii) delay circuit 136 detects that the second voltage has decreased to a value lower than or equal to the third threshold or has increased to a value higher than or equal to the fourth threshold.

In the example illustrated in FIG. 8, at time point T28 when delay time Td that is longer than minimum delay time Tdmin passes from time point T27 when monitoring circuit 34 detects that the first voltage has increased from a value lower than second threshold Vth2 to a value higher than or equal to second threshold Vth2, delay circuit 136 detects that the second voltage has decreased to a value lower than or equal to the third threshold. Accordingly, at time point T28, delay circuit 136 causes second control power supply 32 to start supply of the second voltage. In this manner, it is possible to prevent the second voltage that is higher than the third threshold and lower than the fourth threshold from being supplied to second lighting control circuit 42. In addition, In FIG. 8, delay circuit 136 detects that the second voltage is a value lower than or equal to the third threshold at time point T23 when minimum delay time Tdmin passes from time point T22 when monitoring circuit 34 detects that the first voltage has increased from a value lower than second threshold Vth2 to a value higher than or equal to second threshold Vth2, and thus delay circuit 136 causes second control power supply 32 to start supply of the second voltage at time point T23. Accordingly, it is possible to start the supply of the second voltage after a delay time of a minimum necessary length.

Subsequent to Step S25, the operation returns to Step S21, and lighting device 110 repeats the above-described processes.

As described above, with lighting device 110 according to the present embodiment, the second voltage is not supplied to second lighting control circuit 42 when the second voltage is higher than the third threshold and lower than the fourth threshold, and thus it is possible to suppress occurrence of control failure in second lighting control circuit 42. In addition, when the second voltage is not higher than the third threshold or lower than the fourth threshold, it is possible to promptly (i.e., when minimum delay time Tdmin passes) supply the second voltage to second lighting control circuit 42. For that reason, it is possible to, for example, activate lighting device 110 without involving an unnecessarily lengthy delay from the start of supply of AC power.

[2-3. Conclusion]

As described above, in lighting device 110 according to the present embodiment, reset circuit 150 causes second control power supply 32 to stop supply of the second voltage to second lighting control circuit 42 when reset circuit 150 detects that (i) the first voltage has increased from a value lower than second threshold Vth2 to a value higher than or equal to second threshold Vth2, and that (ii) the second voltage is higher than a third threshold and lower than a fourth threshold.

In this manner, it is possible to suppress occurrence of control failure in second lighting control circuit 42, as with Embodiment 1. In addition, since the second voltage is monitored and supply of the second voltage is started when the second voltage is not higher than the third threshold or lower than the fourth threshold, it is possible to prevent activation of lighting device 110 from being delayed more than necessary.

In addition, in lighting device 110, the third threshold may be a reset voltage of the wireless communication integrated circuit, and the fourth threshold may be an operation voltage lower limit of the wireless communication integrated circuit.

This prevents second lighting control circuit 42 from being supplied with the second voltage which causes the wireless communication integrated circuit to be placed in an undefined state, and thus it is possible to suppress occurrence of control failure in lighting device 110.

(Variation, etc.)

Although the lighting device according to the present disclosure is described based on each of the embodiments, the present disclosure is not limited to the above-described embodiments. Other forms in which various modifications apparent to those skilled in the art are applied to the above-described embodiments or forms in which some structural components according to the embodiment and variation examples are arbitrarily combined within the scope of the present discloser are also included within the scope of the present disclosure unless such changes and modifications depart from the scope of the present disclosure.

For example, the operation of lighting device 110 according to Embodiment 2 described above is not limited to the operation indicated in FIG. 7. The following describes another operation example of lighting device 110, with reference to FIG. 9.

Figure 9:
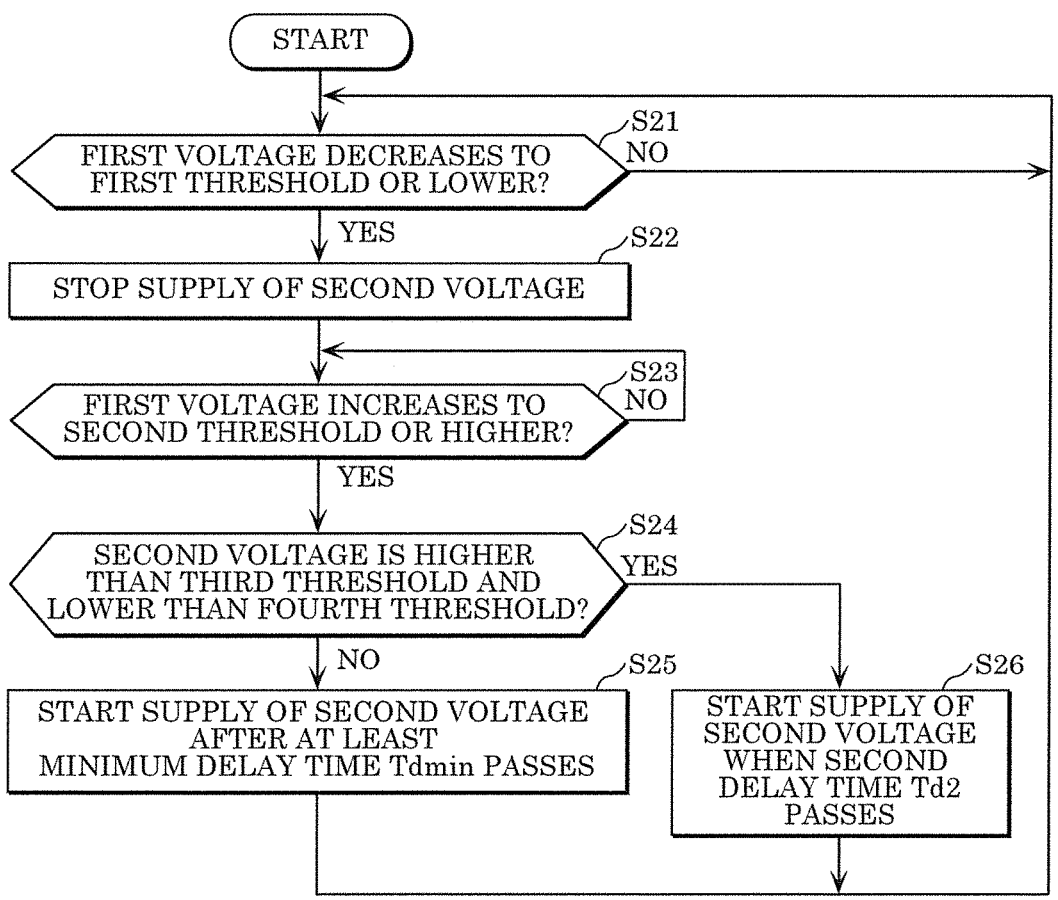
FIG. 9 is a flowchart which illustrates another example of an operation of the lighting device according to Embodiment 2.

FIG. 9 is a flowchart which illustrates another example of the operation of lighting device 110 according to Embodiment 2.

As illustrated in FIG. 9, the operation example includes Step S21 to Step S23, and Step S25 which are identical to Step S21 to Step S23, and Step S25 of the operation example indicated in FIG. 7. However, in the operation example illustrated in FIG. 9, when delay circuit 136 detects that the second voltage is a value higher than the third threshold and lower than the fourth threshold in Step S24 (YES in S24), delay circuit 136 causes supply of the second voltage to be started when the second delay time Td2 passes (S26). Here, second delay time Td2 is, for example, a period of time longer than or equal to a period of time required for the second voltage to decrease from the operation voltage lower limit of the wireless communication integrated circuit to the reset voltage at which the wireless communication integrated circuit is reset, when second control power supply 32 causes supply of the second voltage to be stopped. Subsequent to Step S26, the operation returns to Step S21, and lighting device 110 repeats the processes from Step S21 to Step S26.

As described above, reset circuit 150 of lighting device 110 may cause second control power supply 32 to start supply of the second voltage to second lighting control circuit 42 when second delay time Td2 passes from a time point when reset circuit 150 detects that the second voltage has decreased below the fourth threshold.

In this manner, lighting device 110 is capable of producing an advantageous effect same as or similar to the advantageous effect produced by the operation according to Embodiment 2. In addition, this eliminates the need for delay circuit 136 to continue monitoring of the second voltage, and thus it is possible to simplify the operation of delay circuit 136.

In addition, it is possible to apply lighting device 10 and lighting device 110 according to the above-described embodiments to various luminaires.

Figure 10A:
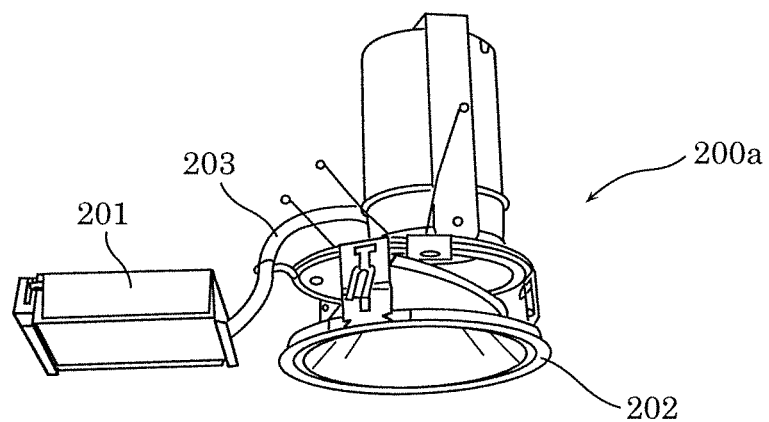
FIG. 10A is an external view of an example of a luminaire which includes the lighting device according to each of the embodiments.
Figure 10B:
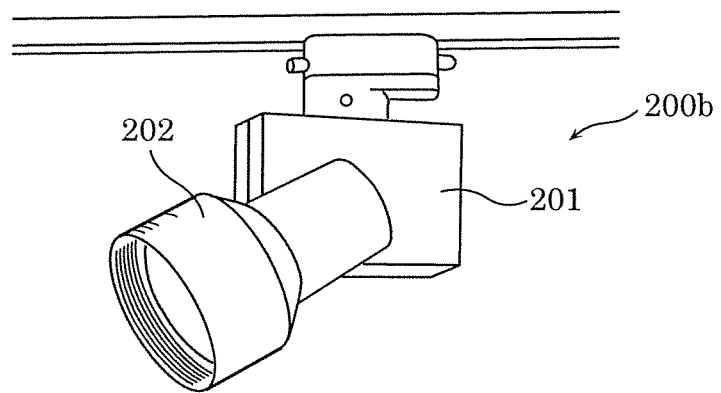
FIG. 10B is an external view of another example of a luminaire which includes the lighting device according to each of the embodiments.

FIG. 10A and FIG. 10B are external views of luminaires 200a and 200b each including lighting device 10 or lighting device 110. Luminaire 200a illustrated in FIG. 10A is a downlight, and luminaire 200b illustrated in FIG. 10B is a spotlight. Luminaire 200a and luminaire 200b each include circuit box 201 and lighting body 202. Luminaire 200a further includes line 203. Circuit box 201 is a box in which lighting device 10 or lighting device 110 according to the above-described embodiments is housed. Lighting body 202 houses light emitting element 4. Line 203 electrically connects circuit box 201 with a light source housed in lighting body 202.

Luminaire 200a and luminaire 200b include light emitting element 4 and lighting device 10 or lighting device 110 according to the above-described embodiments, and thus are capable of suppressing occurrence of control failure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device which causes a light emitting element to emit light, the lighting device comprising:
   a DC power supply which converts AC power to DC power;
   a first lighting control circuit which adjusts a value of a current supplied to the light emitting element, by controlling the DC power supply;
   a second lighting control circuit which controls the first lighting control circuit;
   a first control power supply which supplies a first voltage to the first lighting control circuit;
   a second control power supply to which the first voltage is supplied and which supplies a second voltage to the second lighting control circuit; and a reset circuit which (i) when the reset circuit detects that the first voltage decreases to a first threshold or lower, causes the second control power supply to stop supply of the second voltage, and (ii) when the reset circuit detects that the first voltage increases to a second threshold or higher and that the second voltage is higher than a third threshold, causes the second control power supply to start supply of the second voltage after the second voltage decreases to the third threshold or lower.

2. The lighting device according to claim 1, wherein the reset circuit causes the second control power supply to start supply of the second voltage when a first delay time passes from a time point when the reset circuit detects that the first voltage has increased to the second threshold or higher.

3. The lighting device according to claim 2, wherein the second lighting control circuit includes a wireless communication integrated circuit which outputs, to the first lighting control circuit, an instruction signal for instructing one of turning on, turning off, and dimming of the light emitting element, according to an input signal from outside.

4. The lighting device according to claim 3, wherein the first delay time is longer than or equal to a period of time required for the second voltage to decrease from an operation voltage lower limit of the wireless communication integrated circuit to a reset voltage at which the wireless communication integrated circuit is reset, when the reset circuit causes the second control power supply to stop supply of the second voltage.

5. The lighting device according to claim 3, wherein at least one of the first threshold and the second threshold are higher than or equal to an operation voltage lower limit of the wireless communication integrated circuit.

6. The lighting device according to claim 1, wherein the first threshold is lower than the second threshold.

7. The lighting device according to claim 2, wherein the first delay time is longer than a period of time taken from a start of the DC power supply until an operation of the DC power supply is stabilized.

8. The lighting device according to claim 1, wherein the reset circuit causes the second control power supply to stop supply of the second voltage to the second lighting control circuit when the reset circuit detects that (i) the first voltage has increased from a value lower than the second threshold to a value higher than or equal to the second threshold, and that (ii) the second voltage is higher than the third threshold and lower than a fourth threshold.

9. The lighting device according to claim 8, wherein the second lighting control circuit includes a wireless communication integrated circuit which outputs, to the first lighting control circuit, an instruction signal for instructing one of turning on and turning off of the light emitting element, according to an input signal from outside,
the third threshold is a reset voltage of the wireless communication integrated circuit, and
the fourth threshold is an operation voltage lower limit of the wireless communication integrated circuit.

10. The lighting device according to claim 8, wherein the reset circuit causes the second control power supply to start supply of the second voltage to the second lighting control circuit when a second delay time passes from a time point when the reset circuit detects that the second voltage has decreased below the fourth threshold.

11. The lighting device according to claim 1, wherein the second control power supply includes a three-terminal regulator.

12. A luminaire, comprising:
the lighting device according to claim 1; and
the light emitting element.

13. A method of controlling a lighting device, the lighting device including: a DC power supply which converts AC power to DC power; a first lighting control circuit which adjusts a value of a current supplied to a light emitting element, by controlling the DC power supply; a second lighting control circuit which controls the first lighting control circuit; a first control power supply which supplies a first voltage to the first lighting control circuit; and a second control power supply to which the first voltage is supplied and which supplies a second voltage to the second lighting control circuit, the method of controlling of the lighting device comprising:
when it is detected that the first voltage decreases to a first threshold or lower, causing the second control power supply to stop supply of the second voltage; and
when it is detected that the first voltage increases to a second threshold or higher and that the second voltage is higher than a third threshold, causing the second control power supply to start supply of the second voltage after the second voltage decreases to the third threshold or lower.

14. The method of controlling the lighting device according to claim 13, wherein
in the causing the second control power supply to start supply of the second voltage, the second control power supply is caused to start supply of the second voltage when a first delay time passes from a time point when it is detected that the first voltage has increased to the second threshold or higher.

15. The method of controlling the lighting device according to claim 14, wherein
the second lighting control circuit includes a wireless communication integrated circuit which outputs, to the first lighting control circuit, an instruction signal for instructing one of turning on, turning off, and dimming of the light emitting element, according to an input signal from outside.

16. The method of controlling the lighting device according to claim 15, wherein
the first delay time is longer than or equal to a period of time required for the second voltage to decrease from an operation voltage lower limit of the wireless communication integrated circuit to a reset voltage of the wireless communication integrated circuit, when the second control power supply is caused to stop supply of the second voltage.

17. The method of controlling the lighting device according to claim 15, wherein
at least one of the first threshold and the second threshold are higher than or equal to an operation voltage lower limit of the wireless communication integrated circuit.

18. The method of controlling the lighting device according to claim 13, wherein
in the causing the second control power supply to stop supply of the second voltage, the second control power supply is caused to stop supply of the second voltage to the second lighting control circuit when it is detected that (i) the first voltage has increased to the second threshold or higher and that (ii) the second voltage is higher than the third threshold and lower than a fourth threshold.

19. The method of controlling the lighting device according to claim 18, wherein
the second lighting control circuit includes a wireless communication integrated circuit which outputs, to the first lighting control circuit, an instruction signal for instructing one of turning on and turning off of the light emitting element, according to an input signal from outside,
the third threshold is a reset voltage of the wireless communication integrated circuit, and
the fourth threshold is an operation voltage lower limit of the wireless communication integrated circuit.

20. The method of controlling the lighting device according to claim 18, wherein
in the causing the second control power supply to start supply of the second voltage, the second control power supply is caused to start supply of the second voltage to the second lighting control circuit when a second delay time passes from a time point when it is detected that the second voltage has decreased from a value higher than or equal to the fourth threshold to a value lower than the fourth threshold.

\* \* \* \* \*